3,165,442
METHOD OF KILLING INSECTS WITH DIHYDRO-NAPHTHYL N-METHYLCARBAMATE COMPOSITIONS
John R. Kilsheimer, South Charleston, W. Va., and Herbert H. Moorefield, Raleigh, N.C., assignors to Union Carbide Corporation, a corporation of New York
No Drawing. Original application Dec. 30, 1960, Ser. No. 79,521, now Patent No. 3,081,340, dated Mar. 12, 1963. Divided and this application Dec. 26, 1962, Ser. No. 251,456
9 Claims. (Cl. 167—32)

This invention relates to new chemical compounds and to insecticidal compositions containing them. More particularly, this invention relates to hydrogenated 1-naphthyl N-methylcarbamates and to insecticidal compositions containing the same.

The compounds of this invention are represented by the structural formula:

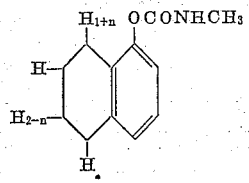

wherein $n$ is an integer selected from the group consisting of 0 and 1. The compounds of this invention are 1-(5,6-dihydronaphthyl) N-methylcarbamate, and 1-(5,8-dihydronaphthyl) N-methylcarbamate.

The compounds of this invention can be prepared generally by reacting the appropriate dihydronaphthol with phosgene in the presence of a base to form the corresponding chloroformate. The chloroformate is then reacted with monomethylamine to form the substituted 1-naphthyl N-methylcarbamate. This synthesis can be graphically represented by the following equations, employing the preparation of 1-(5,6-dihydronaphthyl) N-methylcarbamate as an example.

Step A:

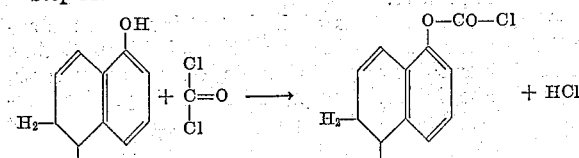

Step B:

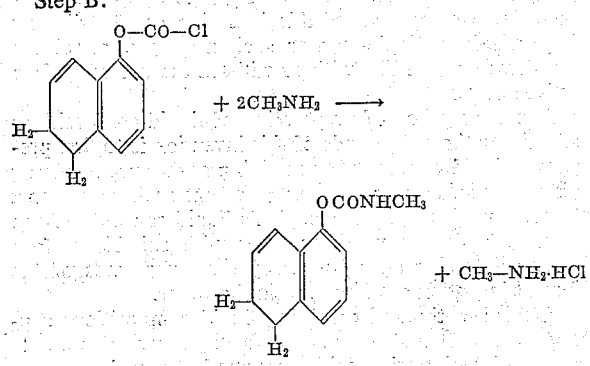

Step A can be conducted at a temperature of from about −30° C. to about 175° C. The reaction can be initiated by adding phosgene dissolved in toluene, benzene, or other suitable organic solvent to an aqueous solution of the substituted naphthol and sodium hydroxide. The reaction is generally exothermic so that some external cooling is usually necessary. This reaction can be conducted in the presence of other basic compounds in place of sodium hydroxide, such as pyridine and dimethylaniline, to facilitate removal of hydrogen chloride as an organic hydrochloride. In these cases the reaction can advantageously be conducted in solvents such as toluene, dioxane and the like.

Step B can be conducted at a temperature of from about −30° C. to about 100° C. The chloroformate can be added to a solution of methylamine in such solvents as water, benzene, hexane, dioxane and toluene.

The products are crystalline solids which can be separated from the reaction mixture by filtration or centrifugation and dried.

An alternate procedure for the preparation of the compounds of this invention is by the reaction of the appropriate substituted 1-naphthol with methyl isocyanate, as represented by the following schematic equation:

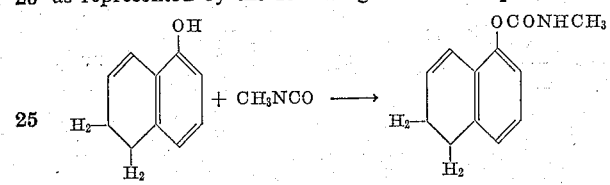

This reaction is conducted by reacting the appropriate naphthol and methyl isocyanate in the presence of an anhydrous inert solvent and a catalyst in a pressure vessel under autogenous pressure and at from about ambient temperatures to about 200° C. The solvent is removed from the reaction mixture by decantation, filtration or distillation and the solid product, primarily the methylcarbamate, can be recrystallized from an organic solvent. The catalyst can be an organo-metallic compound, such as dibutyl tin diacetate or an organic tertiary amine, such as pyridine. Applicable reaction solvents are ethyl ether, benzene, dioxane and the like. The methylcarbamates can be recrystallized from solvents such as xylene, petroleum ether, benzene, methanol and mixtures thereof.

The following examples are illustrative of the preparation of the compounds of this invention:

EXAMPLE I.—*1-(5,6-Dihydronaphthyl) N-methylcarbamate*

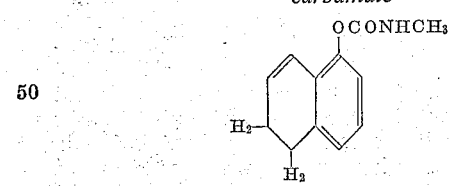

A mixture of 20 grams of 5,6-dihydro-1-naphthol, 9 grams of methyl isocyanate, 4 drops (approximately 0.2 cc.) of dibutyl tin diacetate, and 100 milliliters of ethyl ether was charged to a pressure container and held at ambient temperature and autogenous pressure for four days. The resulting reaction mixture was removed from the pressure container and was distilled to recover the ethyl ether. The solid residue that remained was recrystallized from a mixture of 50 volume percent of xylene and 50 volume percent of petroleum ether and dried. The recrystallized product was 1-(5,6-dihydronaphthyl) N-methylcarbamate which melted at 110° C. and weighed 24 grams and analyzed as follows: N, 7.0 percent (calculated: N, 6.9 percent).

EXAMPLE II.—1-(5,8-Dihydronaphthyl) N-methylcarbamate

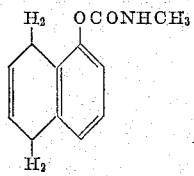

A mixture of 20 grams of 5,8-dihydro-1-naphthol, 9 grams of methyl isocyanate, 4 drops (approximately 0.2 cc.) of dibutyl tin diacetate and 100 milliliters of ethyl ether was charged to a pressure container and was held at ambient temperature and under autogenous pressure for four days. The resulting reaction mixture was removed from the pressure container and distilled to remove the ethyl ether. The solid residue that remained was recrystallized from a mixture of xylene and petroleum ether and dried. The resulting 1-(5,8-dihydronaphthyl) N-methylcarbamate weighed 28 grams, melted at 105° C. and analyzed as follows: N, 6.9 percent (calculated N, 6.9 percent).

The compounds of this invention are useful as insecticides. They are particularly effective as insecticides against bean aphids and house flies, as is illustrated by the following tests.

The compounds are identified in the below-described tests as follows.

Compound number: Compound
I ____ 1-(5,6-dihydronaphthyl) N-methylcarbamate.
II ___ 1-(5,8-dihydronaphthyl) N-methylcarbamate.

Stock formulations of the compounds listed above were prepared by mixing 100 milligrams of the toxicant with 10 milliliters of acetone and 10 milligrams of a dimeric alkylated aryl polyether alcohol commercially sold as a wetting agent. This mixture was then diluted with water to give 100 milliliters of a standard insecticidal solution. Lower, graded, test concentrations were prepared by diluting the standard stock solution with water to give the desired concentration of toxicant. The solutions containing various concentrations in a dilution series were then tested on house flies and bean aphids. Percent mortality of the test insects was plotted against the toxicant concentration on logarithmic probability paper. The concentration in milligrams of toxicant per 100 milliliters of solution needed for 50 percent mortality ($LD_{50}$ value) was interpolated from a line drawn through the points so plotted.

Fly Bait Test

The test insects were four to six day old adult house flies (*Musca domestica* L.) that were reared according to the specifications of the Chemical Specialties Manufacturing Association [Blue Book, MacNair-Dorland Company, New York, pages 243–244, 261 (1954)], at temperature of 80° F.±2° F. and a relative humidity of 50 percent±5 percent. The adult flies were anesthetized with $CO_2$ and twenty-five of such flies were placed under a hemispherical wire cage, approximately 5 inches in diameter and 3 inches high, which was inverted over a sheet of white blotting paper measuring six inches by six inches, on which was placed a bait cup containing a one-inch square pad of a commercially available cellulose absorbent material.

Fifteen milliliters of a test formulation prepared as described above, to which had also been added 10 percent by weight of sugar, were added to the bait cup. The flies were kept at a temperature of 80° F.±5° F. and a relative humidity of 50 percent±5 percent for twenty-four hours. Flies which showed no sign of movement on prodding after the twenty-four hour period were considered dead.

Controls were conducted with solutions prepared as above but without the toxicant.

Aphid Foliage Spray Test

The test insects were adult and nymph stage bean aphids (*Aphis fabae* Scop.) reared on potted dwarf nasturtium plants at a temperature of 65 to 70° F. and a relative humidity of 50 to 70 percent. The aphid populations in the pots were reduced to 100 to 150 individuals per pot by trimming off plants containing excess aphids. The pots were sprayed with toxicant solution, employing a De Vilbiss spray gun at forty pounds pressure, for thirty seconds, in which time 100 to 110 milliliters of the test solution, an amount sufficient to wet the plants to run-off, was applied. A control solution consisting of 100 to 110 milliliters of an aqueous solution of acetone and wetting agent was also sprayed on infested plants. After spraying, the pots were placed on their sides on a sheet of white paper that had been previously ruled into squares to facilitate counting, and held for twenty-four hours at a temperature of 80° F.±5° F. and a relative humidity of 50 percent ±5 percent. Aphids that had fallen to the paper and were unable to remain standing after being uprighted were considered dead, as well as those remaining on the plants that could not move the length of the body, even upon prodding.

The results of the above-described tests are summarized in Table I below. The mortality figures shown have been corrected for the mortality rate observed in the controls.

TABLE I

| Compound | $LD_{50}$ Values, mg./100 ml. Bean Aphid | House Fly |
|---|---|---|
| I | 2.0 | 7 |
| II | 3.0 | 14 |

From Table I it can be seen that the compounds of this invention are insecticidally effective toward both bean aphids and house flies. These compounds have also been found to be insecticidally active toward the Southern armyworm and the Mexican bean beetle. Furthermore, the compounds of this invention are stable in the presence of light and air.

The compounds of this invention can be applied to plants or other areas to be protected by contacting such area with a compound of the instant invention in an undiluted form, as a dust when admixed with finely powdered inert carriers, or in a liquid form. The rate of application can very from about 0.5 to about 5 pounds of the compound per acre.

When the compounds of the instant invention are applied as dusts they can be mixed with suitable particulate extenders, such as clay, chalk, talc, diatomaceous earth, pyrophyllite, infusorial earth, fuller's earth, pumice, bentonite, and flours, such as cotton seed flour and walnut shell flour.

The application of the instant compounds in a liquid medium can be accomplished in any of several ways. For example, a compound of this invention can be directly dispersed in a liquid carrier such as water, petroleum distillates and the like with or without the use of surface active agents.

Another method of preparation of liquid compositions containing the compounds of this invention is to first prepare a liquid concentrate containing such compounds by dissolving said compounds in a solvent such as acetone, toluene, xylene or kerosene. This liquid concentrate can then be added to water together with suitable surface active dispersing agents whereby the compounds of the instant invention are dispersed in the water.

A third method of preparing liquid compositions containing the instant compounds is to prepare a wettable powder by dispersing said compounds on or in a finely divided inert solid such as clay, chalk, talc, bentonite, fuller's earth and the like. These compositions may also contain dispersing or wetting agents as desired. These compositions can then be mixed with water to provide a liquid insecticide suitable for application to the areas to be treated.

The surface active agents that can be employed in the above-described compositions can be any of the known anionic, cationic, and non-ionic wetting, emulsifying and dispersing agents, such as aralkyl polyether alcohols, aralkyl polyether sulfonates, aralkyl polyether sufates, quaternary ammonium compounds, and the like. When these surface active agents are employed they generally comprise from about 0.5% to about 5% by weight of the total composition.

This application is a division of application Serial No. 79,512, filed December 30, 1960, now United States Patent 3,081,340.

We claim:

1. An insecticidal composition comprising a compound represented by the structural formula:

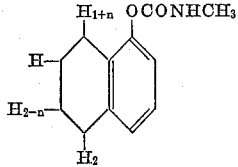

wherein $n$ is an integer having a value of from 0 to 1, an insecticidally suitable carrier and a surfactant.

2. An insecticidal composition comprising 1-(5,6-dihydronaphthyl) N-methylcarbamate an insecticidally suitable carrier and a surfactant.

3. An insecticidal composition comprising 1-(5,8-dihydronaphthyl) N-methylcarbamate, an insecticidally suitable carrier and a surfactant.

4. The process for killing insects which comprises applying an insecticidal amount of a compound represented by the structural formula:

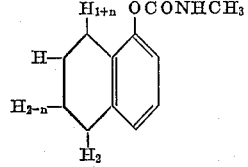

wherein $n$ is an integer having a value of from 0 to 1, to a locus to be protected.

5. The process for killing insects which comprises applying an insecticidal amount of 1-(5,6-dihydronaphthyl) N-methylcarbamate to a locus to be protected.

6. The process for killing insects which comprises applying an insecticidal amount of 1-(5,8-dihydronaphthyl) N-methylcarbamate to a locus to be protected.

7. The process for killing insects which comprises applying an insecticidal amount of a compound represented by the structural formula:

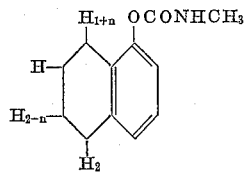

wherein $n$ is an integer having a value of from 0 to 1, to said insects.

8. The process for killing insects which comprises applying an insecticidal amount of 1-(5,6-dihydronaphthyl) N-methylcarbamate to said insects.

9. The process for killing insects which comprises applying an insecticidal amount of 1-(5,8-dihydronaphthyl) N-methylcarbamate to said insects.

References Cited in the file of this patent

UNITED STATES PATENTS

| | | |
|---|---|---|
| 2,493,710 | Aeschlimann et al. | Jan. 3, 1950 |
| 2,776,197 | Gysin et al. | Jan. 1, 1957 |
| 2,903,478 | Lambreck | Sept. 8, 1959 |
| 2,904,464 | Moorefield | Sept. 15, 1959 |
| 2,904,465 | Moorefield | Sept. 15, 1959 |

FOREIGN PATENTS

| | | |
|---|---|---|
| 578,169 | Canada | June 23, 1959 |